INVENTOR.
NELSON E. COLE
BY
Lawrence C. Witker
ATTY.

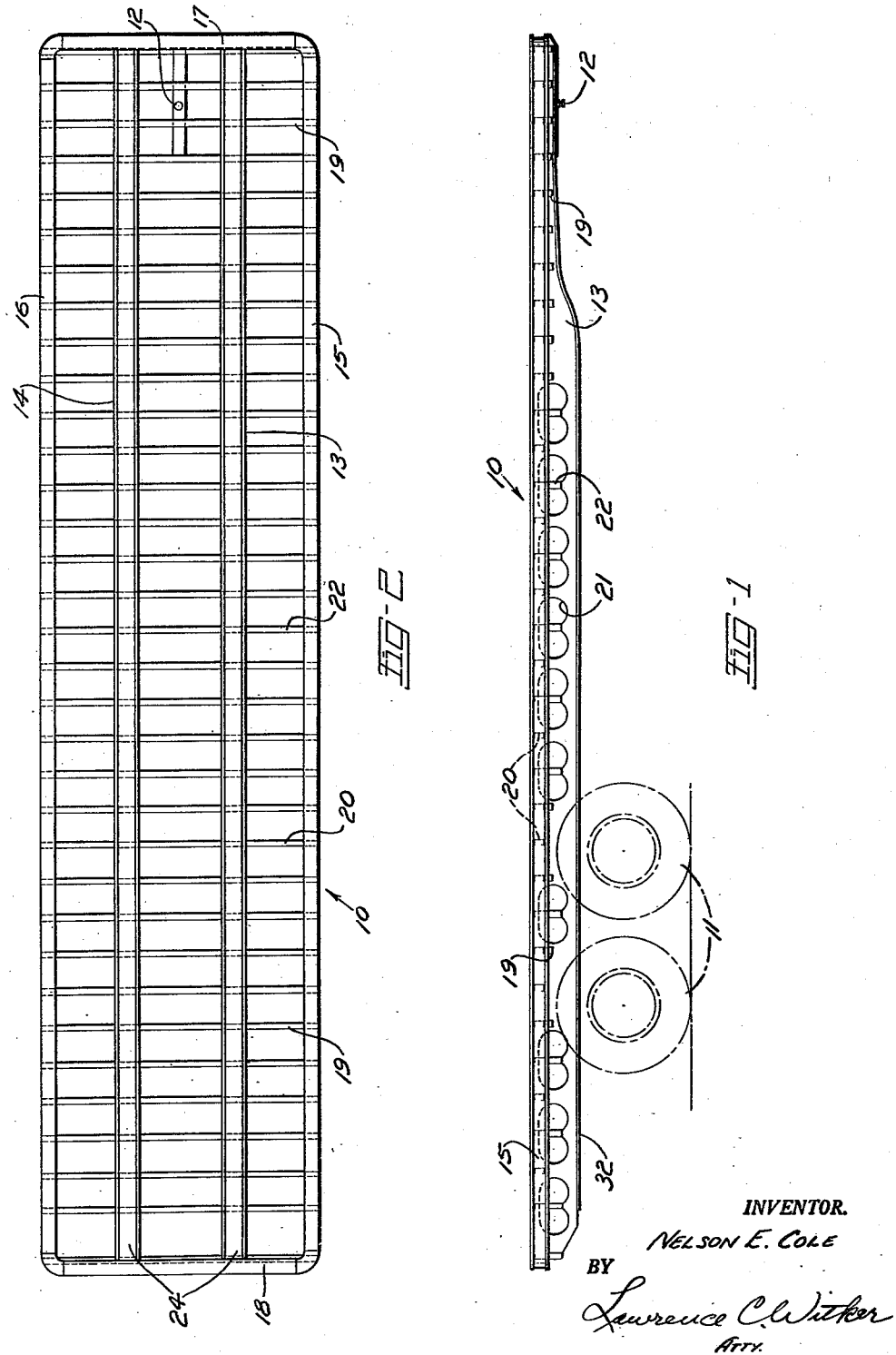

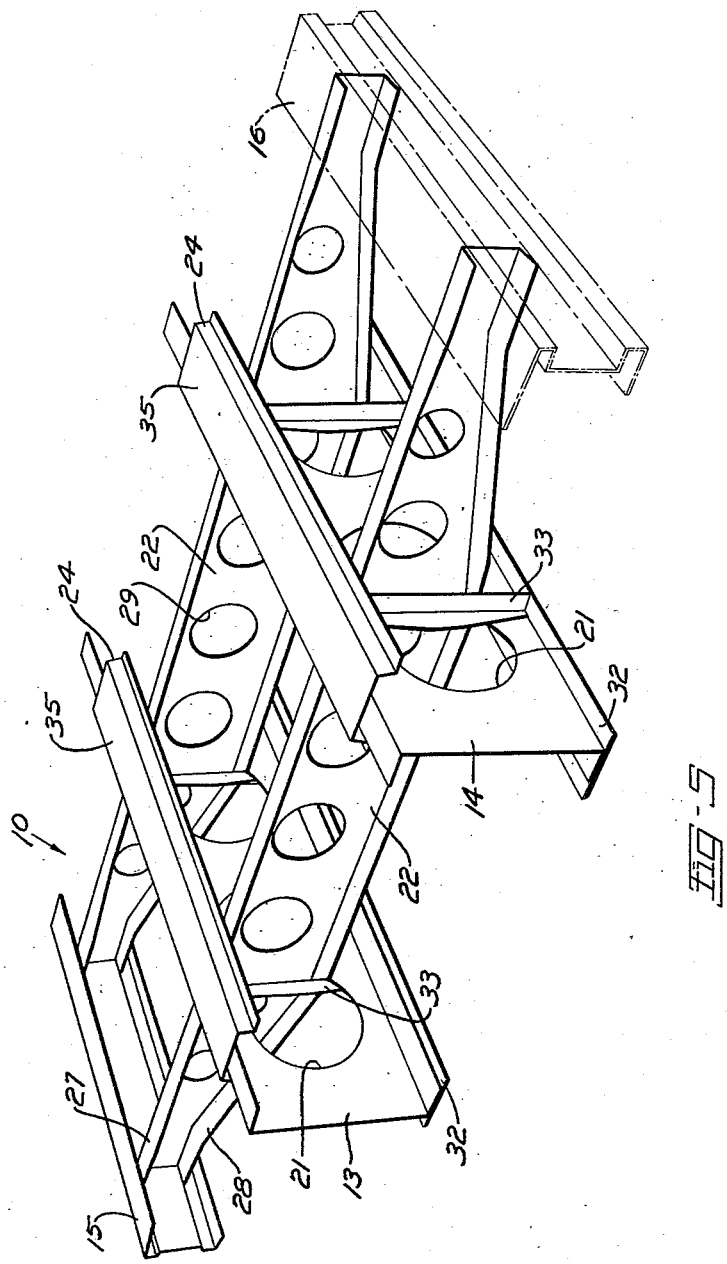

United States Patent Office 2,812,192
Patented Nov. 5, 1957

2,812,192

TRUCK TRAILER FRAME

Nelson E. Cole, Reading, Pa., assignor to Dana Corporation, Toledo, Ohio, a corporation of Virginia Application March 31, 1955, Serial No. 498,380

3 Claims. (Cl. 280—106)

This invention relates to truck trailer chassis. It is the purpose of this invention to provide a frame that will be stronger than is presently known for trailers and yet lighter in weight and easier to assemble.

The above stated purposes are realized by the use of cross-members and longitudinal beams made from relatively light gauge channels. The longitudinal beams are bottomed with flat tension bars, capped and laterally braced with floor supporting sections. By having the cross-beams narrower than the longitudinal main rails, they can pass thru the main rails, above the bottom flanges at the points of intersection, making a more rigid lateral brace. This invention also simplifies and shortens the assembly operation, eliminates diagonal braces and permits the flooring to fit flush with the structural members.

In the drawings in which parts bear like numbers throughout:

Figure 1 is a side view of a trailer chassis which incorporates the present invention.

Figure 2 is a plan view of the structure shown in Figure 1.

Figure 5 is a perspective view of a section of the chassis of Figure 1 further illustrating details of the invention.

Figure 3:
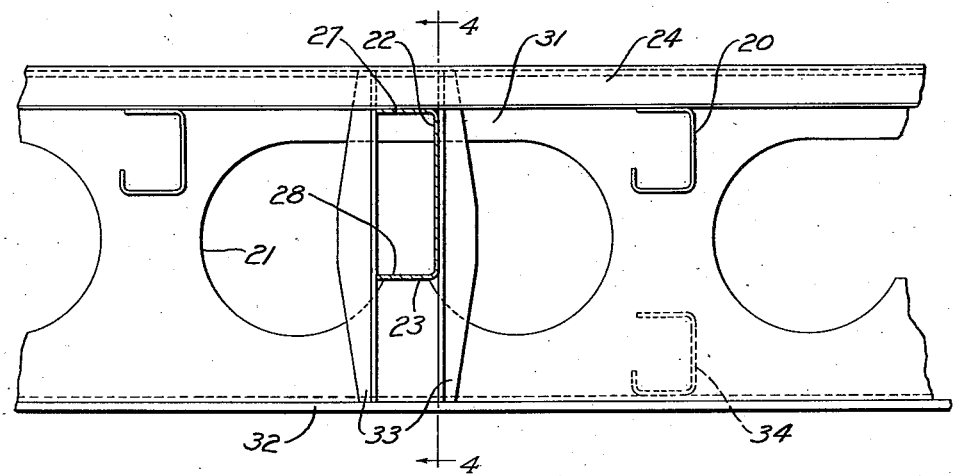
Figure 3 is an enlarged detail view illustrating the intersection of longitudinal and cross beams.

The trailer chassis 10 is supported by rear wheels 11 and, while being loaded, by dolly wheels (not shown) at a point far enough behind the king-bolt 12 to allow the tractor to be backed into position. The wheeled support means are not shown in detail as they form no part of this invention, and any desired combination may be used.

The chassis 10 consists mainly of longitudinal rails or beams 13, 14, side rails 15, 16, end rails 17, 18, and cross members of varying size and component parts. All of the rails are preferably of channel section having top and bottom flanges connected by an intermediate web.

The longitudinal or main rails 13 and 14 are of light comparatively deep section substantially throughout their length, except at their forward ends which are of reduced or somewhat narrower section. A number of cross beams 19, 20, are cut into three sections and are welded, or otherwise secured, into place between the main rails 13, 14, and side rails 15, 16, of the chassis 10. The cross beams 19 at the front of the chassis, over the tractor, and near the rear, adjacent the wheels, are only as deep as the narrow part of main rails 13, 14, and taper at each end to fit in the respective side rails 15, 16. The intermediate beams 20 are of a uniform depth throughout their length and fit in the side rails 15, 16.

Figure 4:
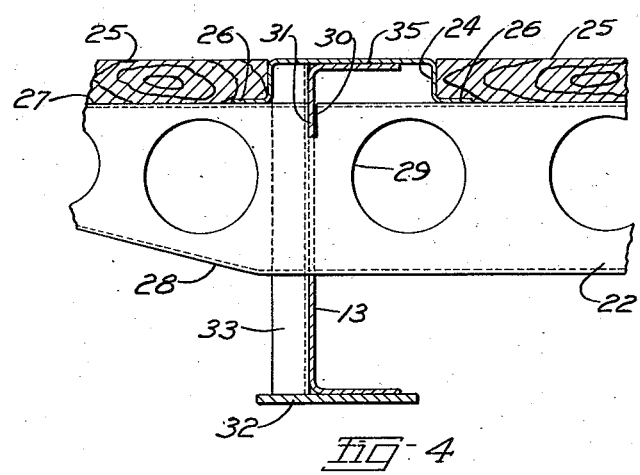
Figure 4 is a view taken substantially on line 4—4 of Figure 3.

Referring particularly to Figures 3, 4, and 5, the main rails 13, 14 are cut out at 21 by any convenient method and any contour to provide an opening of sufficient size to receive the cross beams 22. The one illustrated is preferred for easy assembly, weight reduction without weakening, and for accurate placement of the cross beams 22. An opening similar to the one shown at 21 forms a sill 23 on which to set the cross beams 22. The location of the sill 23 is determined by the depth of the cross beam 22 plus the thickness of the cap 24. The bottom leg 26 of the cap 24 rests on the cross beam 22 and the compression cap 35 rests on a main rail 13 or 14.

The cross beams 19, 20, 22 serve as lateral braces and floor supports. The flooring 25 is shown as wood, but is not limited to this material; it is notched where necessary to fit over the legs 26 of the cap 24 and can fit under the side rails 15, 16 and end rails 17, 18. The cap 24, being the same thickness as the flooring 25, can thus act as a skid rail.

The cross beams 22 are straight across the top flange 27 and taper upward at both ends of the lower flange 28 after it passes through the main rails 13, 14. This taper is again straightened parallel to the top leg 27 where the cross beam 22 enters the channels of the side rails 15, 16. A plurality of holes 29 of varying size are provided in the cross beams to lighten them. The cross beams 22 are notched at 30 to clear the web portion 31 of the main rails 13, 14; this also strengthens the union and locks the pieces in assembled relation.

Due to the fact that the main rails are of comparatively light gauge the main rails 13, 14 are preferably bottomed with the longitudinal tension members or bars 32. Said tension bars 32 are variable in metal mass along the length of the beams 13 and 14 to allow for just the right amount of metal at each position along the beam to give the required resistance to the load stresses encountered.

Additional braces, as the angles 33 are secured, preferably by welding, against either side of the cross beam 22 from inside of the cap 24 to a right angle bearing on the tension bar 32. These angle braces 33 give the chassis the advantage of the strength of a "boxed in" assembly. The combination of angles 33 and main rails 13 and 14 and cross beams 22 form a column strut which transfers the internal stresses between the compression cap 35 and the tension bars 32. This makes it possible to keep the main rails 13 and 14 in an extremely light gauge metal without the danger of their buckling through their web sections.

Short beams 34 may be added in strategic places between the main rails 13, 14 to hold the bottoms of these rails 13, 14 in parallel relation.

It is to be noted that the extra beams 34 and the braces 33 can, in some instances, be dispensed with entirely, or in part, depending on the use for the trailer.

What is claimed is:

1. In a trailer or the like, a floor supporting structure comprising a pair of longitudinal main rails in the shape of sidewardly opening channels including upper and lower flanges, spaced openings in the vertical web of the rails, the web adjacent the bottom of the openings providing sill-like bases, caps on the upper flanges of the rails, and a plurality of cross beams of sidewardly opening form including upper and lower flanges, said cross beams extending transversely of and through the openings in said longitudinal main rails with the lower flanges supported on the sill-like bases of said openings, and with said upper flanges spaced below the upper flanges of said main rails in such a position that the flooring supported thereon will be flush with the crown of the cap on the main rail upper flange, and said cross beam being of a height greater than the vertical dimension of said openings in the area of the sills, the upper flange and web of said cross beams being slotted to receive the web adjacent the top of said openings to interlock the cross beams with said main rails.

2. The structure set forth in claim 1, in which the lower flanges of the main rails are supplemented with longitudinally extending tension members.

3. The structure set forth in claim 1, in which tensioning members bottom the main rails, and further including angle shaped members extending between the caps and the tensioning members on the main rails to provide vertical braces for said cross beams.

References Cited in the file of this patent

UNITED STATES PATENTS

| | | |
|---|---|---|
| 2,322,841 | Forster | June 29, 1943 |
| 2,700,551 | Stump | Jan. 25, 1955 |

FOREIGN PATENTS

| | | |
|---|---|---|
| 103,398 | Australia | Mar. 3, 1938 |
| 108,279 | Australia | Aug. 15, 1939 |
| 667,176 | Great Britain | Feb. 27, 1952 |